(12) United States Patent
Sun et al.

(10) Patent No.: US 7,539,831 B2
(45) Date of Patent: May 26, 2009

(54) METHOD AND SYSTEM FOR PERFORMING MEMORY CLEAR AND PRE-FETCH FOR MANAGED RUNTIMES

(75) Inventors: Mingqiu Sun, Beaverton, OR (US); Kumar Shiv, Portland, OR (US); Bob Kasten, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 580 days.

(21) Appl. No.: 10/920,506

(22) Filed: Aug. 18, 2004

(65) Prior Publication Data

US 2006/0041732 A1    Feb. 23, 2006

(51) Int. Cl.
*G06F 12/06* (2006.01)

(52) U.S. Cl. ....................................................... 711/170

(58) Field of Classification Search .................. 711/170
See application file for complete search history.

(56) References Cited

U.S. PATENT DOCUMENTS

| 6,910,213 B1* | 6/2005 | Hirono et al. ............... 718/108 |
| 2003/0208660 A1* | 11/2003 | van de Waerdt ............. 711/137 |
| 2005/0027933 A1* | 2/2005 | Iyengar ....................... 711/170 |
| 2005/0262324 A1* | 11/2005 | Mathiske ..................... 711/170 |

\* cited by examiner

*Primary Examiner*—Hyung S Sough
*Assistant Examiner*—Hamdy S Ahmed
(74) *Attorney, Agent, or Firm*—L. Cho (57) ABSTRACT

A method for performing memory allocation includes clearing a section in memory in response to an allocation of memory to an object of a thread. The size of the section is larger than a size of the object and smaller than a size of a thread local area associated with the thread.

29 Claims, 6 Drawing Sheets

METHOD AND SYSTEM FOR PERFORMING MEMORY CLEAR AND PRE-FETCH FOR MANAGED RUNTIMES

FIELD

An embodiment of the present invention pertains to memory allocation for objects in a thread. More specifically, an embodiment of the present invention relates to a method and system for performing memory clear and pre-fetch for managed runtimes.

BACKGROUND

The need for increased portability of software programs has resulted in increased development and usage of runtime environments. The term portability refers to the ability to execute a given software program on a variety of computer platforms having different hardware and operating systems. The term "runtime environment" may be referred to as runtime system or virtual machine. The runtime environment allows software programs in source code format to be executed by a target execution platform (i.e., the hardware and operating system of a computer system) in a platform-independent manner. Source code instructions are not statically compiled and linked directly into native or machine code for execution by the target execution platform. Instead, the instructions are statically compiled into an intermediate language (e.g., byte-code) and the intermediate language may then be interpreted or subsequently compiled by a just-in-time (JIT) compiler within the runtime environment into native or machine code that can be executed by the target execution platform.

When a virtual machine supporting concurrent threads is implemented, a heap is shared among the processes. Obtaining space for memory allocation requires a synchronized operation to ensure that more than one object is not allocated to a single space. Synchronization can be expensive, especially if the synchronization primitive is contended. One solution used by virtual machines to reduce the overhead associated with synchronization and contention is to allocate segments of the heap that are local to each thread. These segments are called thread-local memory areas (TLAs). TLAs decentralize memory allocation requests and improve scaling significantly via removal of the need of a global heap lock for frequent access of local variables.

One technique used for clearing space required for objects involves clearing the entire TLA when the TLA is created. Clearing the TLA when it is created offers code simplicity. However, modern processor architectures have a limit to the number of memory write operations that can be outstanding at any given time. Memory clearing imposes significant stress on hardware resources. This type of stress is referred to as "store buffer stall". A second technique used for clearing space required for objects involves clearing the space required for each object in the TLA just before allocation. Clearing only the space required for an object before allocation reduces the frequency of store buffer stalls. However, when using this technique the virtual machine loses control of the size and timing of each write and is unable to manage memory latency issues.

Thus, there exists a need for an effective and efficient method and system for clearing space required for objects for memory allocation.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

Figure 1:
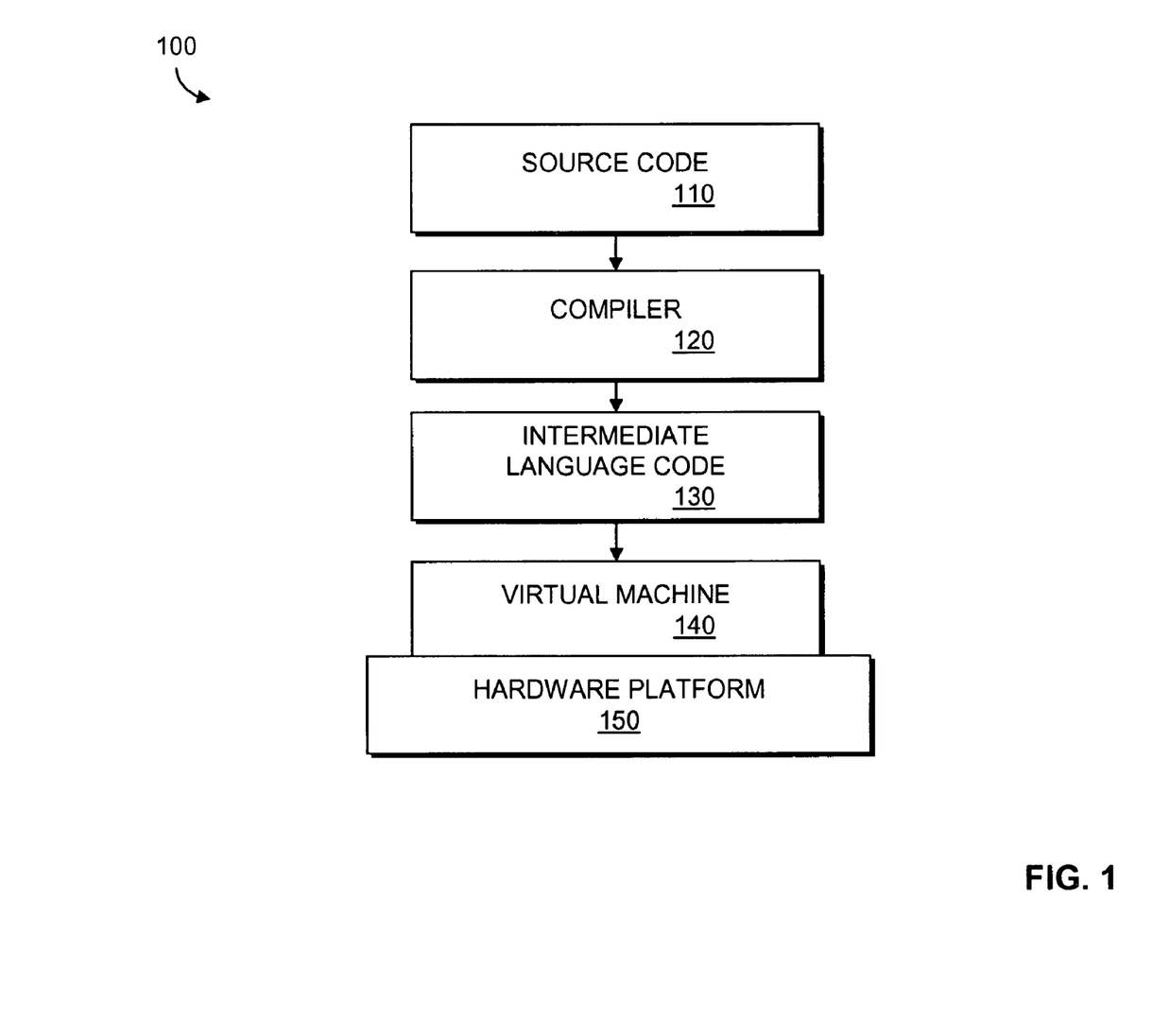
FIG. 1 is a block diagram of a software compilation and execution system according to an embodiment of the present invention.

FIG. 1 illustrates a software program compilation and execution system 100 according to an embodiment of the present invention. The software program compilation and execution system 100 includes a compiler 120 that compiles source code 110 into an intermediate language code 130. The source code 110 may be, for example, Java byte-code or Common Intermediate Language (CIL) code. According to an embodiment of the present invention, the compiler 120 is a software system that is run on a computer system and the intermediate language code 130 is stored in a memory of the computer system.

The software program compilation and execution system 100 includes a virtual machine 140 and a hardware platform 150. The virtual machine 140 further compiles the intermediate language code 130 into native code. According to an embodiment of the present invention, native code is machine code that is particular to a specific architecture or platform. The virtual machine 140 may be implemented as a software system. In this embodiment, the virtual machine 140 runs on the hardware platform 150. The virtual machine 140 may be, for example, a Java virtual machine, a small talk runtime system, or other runtime system. Alternatively, the virtual machine 140 may be implemented using other techniques (e.g., as a firmware system).

The hardware platform 150 executes the native code compiled by the virtual machine 140. The hardware platform 150 may be implemented, for example, by a personal computer, a personal digital assistant, a network computer, a server computer, a notebook computer, a workstation, a mainframe computer, or a supercomputer. Alternatively, the hardware platform 150 may be implemented by any other electronic system with data processing capabilities. The intermediate language code 130 may be delivered to the hardware platform 150 via a communication link such as a local area network, the Internet, or a wireless communication network.

Figure 2:
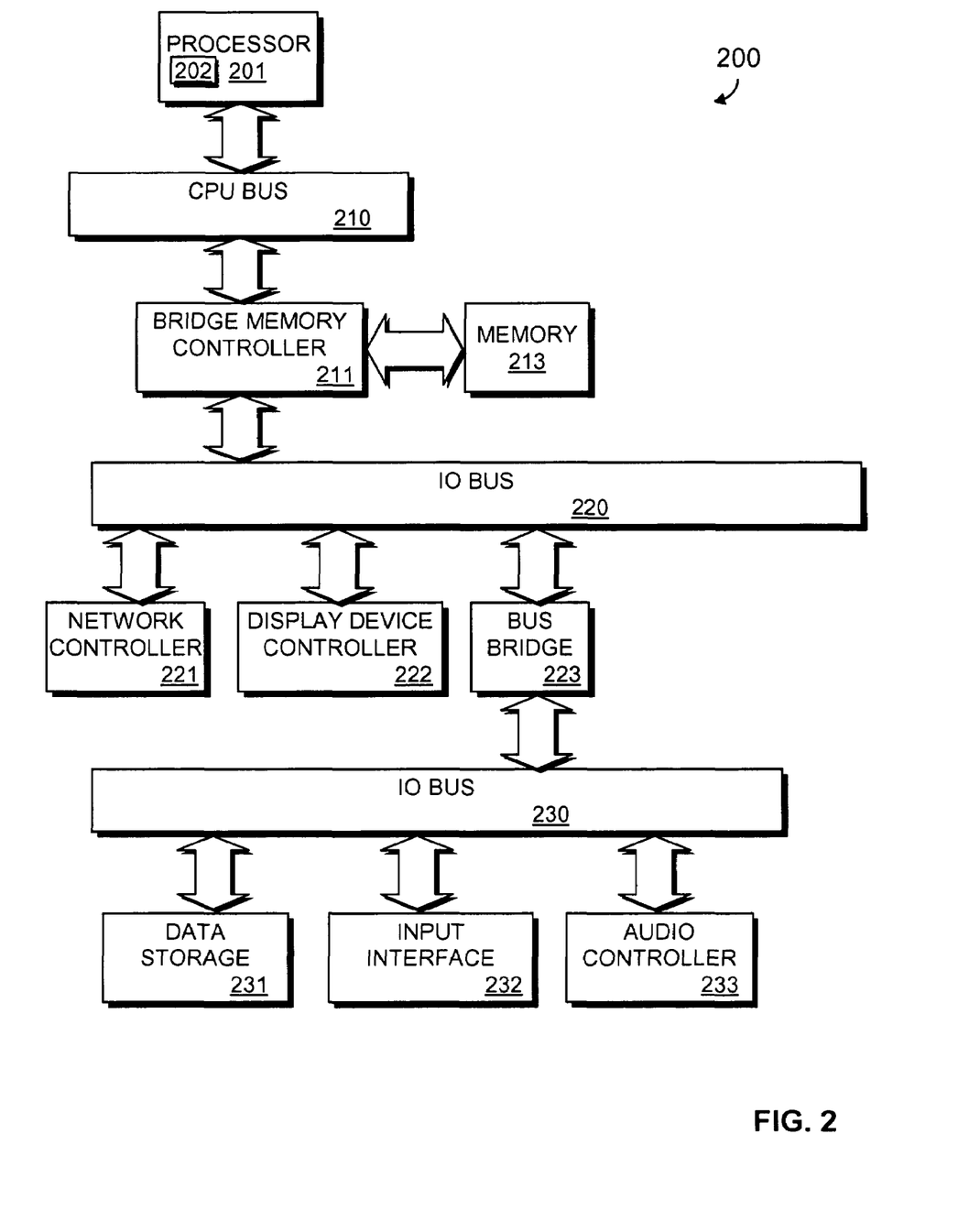
FIG. 2 is a block diagram of a hardware platform according to an embodiment of the present invention.

FIG. 2 is a block diagram of an exemplary computer system 200 according to an embodiment of the present invention. The computer system 200 may be used to implement the hardware platform 150 shown in FIG. 1. The computer system 200 includes a processor 201 that processes data signals. The processor 201 may be a complex instruction set computer microprocessor, a reduced instruction set computing microprocessor, a very long instruction word microprocessor, a processor implementing a combination of instruction sets, or other processor device. FIG. 2 shows the computer system 200 with a single processor. However, it is understood that the computer system 200 may operate with multiple processors. The processor 201 is coupled to a CPU bus 210 that transmits data signals between processor 201 and other components in the computer system 200. According to an embodiment of the present invention, the processor 201 may implement thread-level-parallelism to increase utilization of processor execution resources. By utilizing simultaneous multi-threading technology, multiple threads of software applications may be run simultaneously on the processor 201.

The computer system 200 includes a memory 213. The memory 213 may be a dynamic random access memory device, a static random access memory device, read only memory, and/or other memory device. The memory 213 may store instructions and code represented by data signals that may be executed by the processor 201. A cache memory 202 resides inside processor 201 that stores data signals stored in memory 213. The cache 202 speeds up memory accesses by the processor 201 by taking advantage of its locality of access. In an alternate embodiment of the computer system 200, the cache 202 resides external to the processor 201. The processor 201 may use a store buffer (not shown) to hold data to be written into the cache memory 202 in preparation for depositing it into memory 213.

A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first input output (IO) bus 220.

The first IO bus 220 may be a single bus or a combination of multiple buses. The first IO bus 220 provides communication links between components in the computer system 200. A network controller 221 is coupled to the first IO bus 220. The network controller 221 may link the computer system 200 to a network of computers (not shown) and supports communication among the machines. A display device controller 222 is coupled to the first IO bus 220. The display device controller 222 allows coupling of a display device (not shown) to the computer system 200 and acts as an interface between the display device and the computer system 100.

A second IO bus 230 may be a single bus or a combination of multiple buses. The second IO bus 230 provides communication links between components in the computer system 200. A data storage device 231 is coupled to the second IO bus 230. The data storage device 231 may be a hard disk drive, a floppy disk drive, a CD-ROM device, a flash memory device or other mass storage device. An input interface 232 is coupled to the second IO bus 230. The input interface 232 may be, for example, a keyboard and/or mouse controller or other input interface. The input interface 232 may be a dedicated device or can reside in another device such as a bus controller or other controller. The input interface 232 allows coupling of an input device to the computer system 200 and transmits data signals from an input device to the computer system 200. An audio controller 233 is coupled to the second IO bus 230. The audio controller 233 operates to coordinate the recording and playing of sounds and is also coupled to the IO bus 230. A bus bridge 223 couples the first IO bus 220 to the second IO bus 230. The bus bridge 223 operates to buffer and bridge data signals between the first IO bus 220 and the second IO bus 230.

Figure 3:
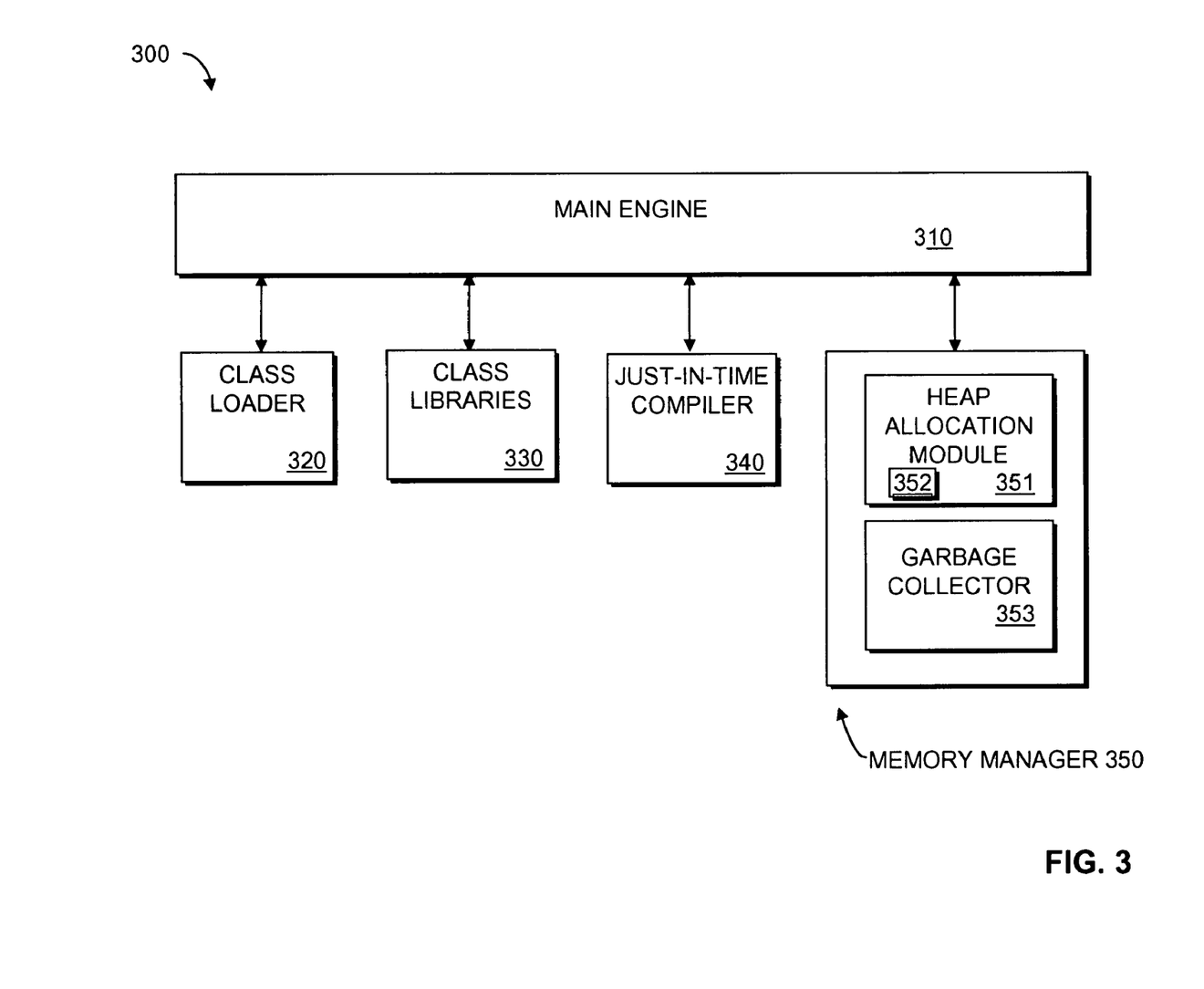
FIG. 3 is a block diagram of a virtual machine according to an embodiment of the present invention.

FIG. 3 is a block diagram of a virtual machine 300 according to an embodiment of the present invention. The virtual machine 300 maybe implemented as the virtual machine 140 shown in FIG. 1. The virtual machine 300 includes a main engine 310. The main engine 310 may be employed as the main core of the virtual machine 300. The main engine 310 monitors compilation and execution of the intermediate language code, and coordinates use of other modules in the virtual machine 300 when required.

The virtual machine 300 includes a class loader 320. The class loader 320 may be used to load classes. The class loader 320 may also perform other functions associated with loading classes. For example, the class loader 320 may also verify loaded classes.

The virtual machine 300 includes class libraries 330. The class libraries 330 may be used to store shared classes when a program may include more than one type of class, (i.e., application-specific class and shared class).

The virtual machine 300 includes a just-in-time compiler 340. The just-in-time compiler 340 may compile intermediate language code to generate native or machine code at runtime that is executed by a hardware platform. According to an embodiment of the present invention, "just-in-time" refers to the just-in-time compiler 340 compiling or translating each method or class when it is used for execution into native code. The just-in-time compiler 340 may also store some compiled native code in a just-in-time in-memory cache (not shown in FIG. 3). In this manner, the virtual machine 300 may re-use native code associated with a previously compiled method or object that is invoked or called more than once.

The virtual machine 300 includes a memory manager 350. The memory manager 350 may be used to manage a specific memory space within the memory referred to as heap or heap space. The memory manager 350 includes a heap allocation module 351 and a garbage collector 353. The heap allocation module 351 is used to allocate objects from the heap space in the memory.

The heap allocation module 351 includes a memory clearing unit 352. According to an embodiment of the heap allocation module 351, the memory clearing unit 352 clears a first section in memory when a thread local area is created for a thread. The size of the first section is a function of a tunable clear size and an aspect or parameter of the thread. According to a further embodiment of the heap allocation module 351, the memory clear unit 352 clears a second section in memory in response to an allocation of memory to an object of the thread when the size of the object is greater than an amount of cleared space available in the thread local area. The size of the second section is a function of the size of the object and the tunable clear size.

The garbage collector 353 is used to reclaim memory space in the heap used by objects that are no longer referenced by an application or method. Additionally, the garbage collector 353 also may move objects to reduce heap fragmentation. The memory manager 350 interacts with the main engine 310 and the just-in-time compiler 340.

The main engine 310, class loader 320, class libraries 330, just-in-time compiler 340, and memory manager 350 may be implemented using any known technique or circuitry. It should be appreciated that other components may also be implemented in the virtual machine 300.

Figure 4:
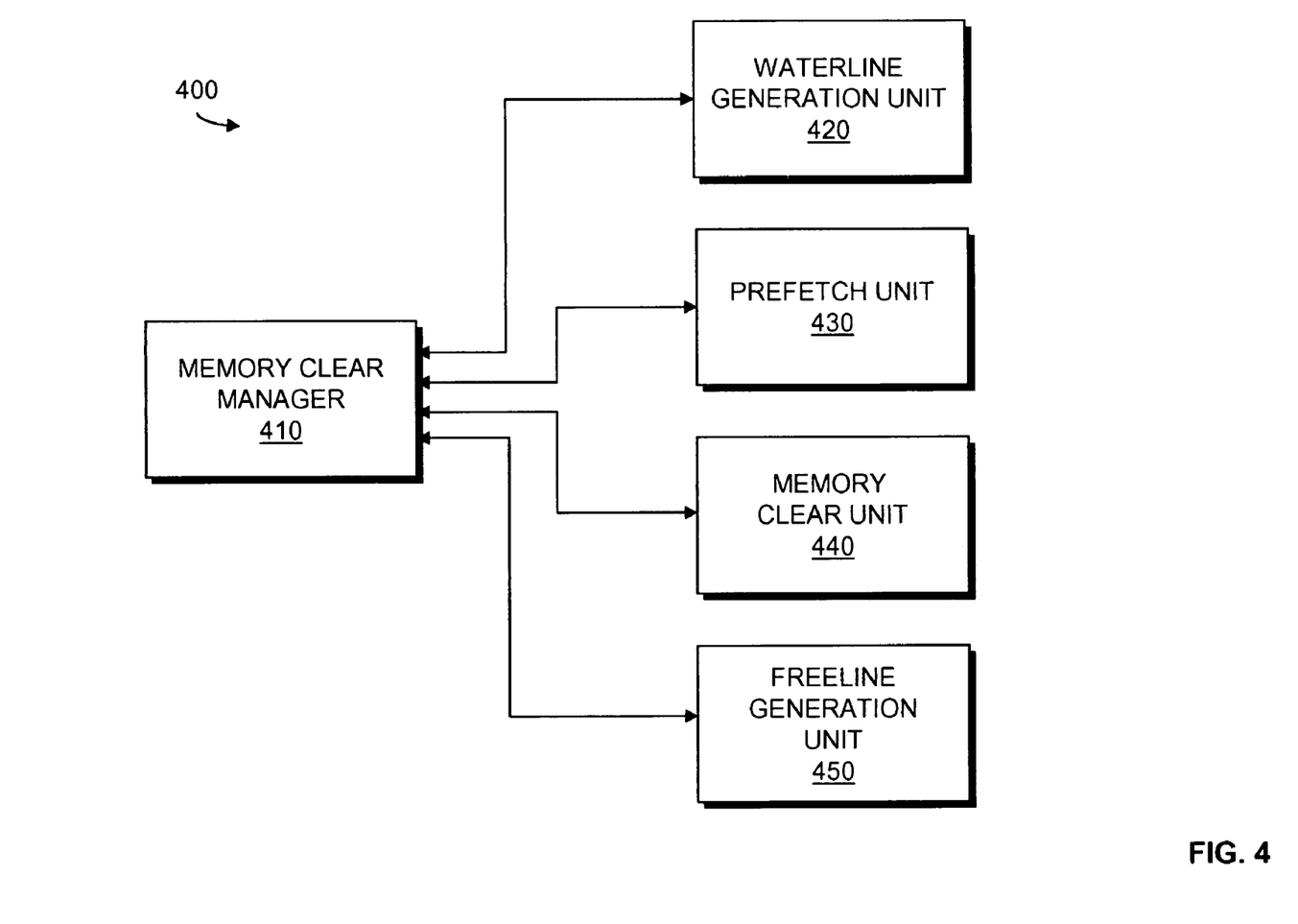
FIG. 4 is a block diagram of a memory clearing unit according to an embodiment of the present invention.

FIG. 4 is a block diagram of a memory clearing unit 400 according to an embodiment of the present invention. The memory clearing unit 400 may be used to implement the memory clearing unit 352 shown in FIG. 3. The memory clearing unit 400 includes a memory clear manager 410. The memory clearing manager 410 manages the operation of the components in the memory clearing unit 400.

The memory clearing unit 400 includes a waterline generation unit 420. The waterline generation unit 420 generates a marker that may be used by the memory clearing unit 400 to determine when to clear a section of memory. The waterline may be used to mark an area in a TLA that has been cleared or that is to be cleared. According to an embodiment of the present invention, an initial waterline is generated upon creation of a TLA for a thread. The initial waterline may be generated in response to a clear size and a parameter of the thread. A parameter of the thread may be, for example, any data in or characteristic of the thread. In one embodiment, a random or pseudo random function may use a parameter of the thread to determine the initial waterline. According to a further embodiment of the present invention, a new waterline is generated when a previously generated waterline is crossed. A waterline is crossed when upon object allocation, a size of an object is greater than a size of cleared space available in the TLA as indicated by the waterline. The new waterline may be generated based on at least the object size and the clear size.

It should be appreciated that timing control of memory clears may be adjusted through the generation of the waterline. For example, an initial waterline may be set differently for different threads. This may be done to reduce the collisions of memory write operations during memory clears. This may be particularly useful in environments using simultaneous multi-threading technology. According to an embodiment of the present invention, the clear size used to generate waterlines may be a fixed parameter that is tunable. A random function may be applied to a parameter of the thread to determine a unique location for the thread's initial waterline.

The memory clearing unit 400 includes a pre-fetch unit 430. The pre-fetch unit 430 performs a read operation that results in writing a location in memory into a cache. This pre-fetch unit 430 pre-fetches locations in memory into the cache that will be cleared during future object allocations. Pre-fetching locations in memory reduces the penalty associated with write misses. According to an embodiment of the present invention, the pre-fetch unit 430 performs pre-fetching upon creation of a TLA. In this embodiment, the pre-fetch unit 430 pre-fetches a section in memory that includes a first section that is a function of a tunable clear size, an aspect or parameter of the thread, and a tunable pre-fetch distance. According to a further embodiment of the present invention, the pre-fetch unit 430 performs pre-fetching in response to an allocation of memory to an object of the thread, where the size of the object is greater than an amount of cleared space available in the thread local area (crosses the waterline). In this embodiment, the pre-fetch unit 430 pre-fetches a section in memory that includes a second section that is a function of the size of the object, a tunable clear size, and a tunable pre-fetch distance. According to an embodiment of the present invention, a non-temporal section of the cache is used for memory allocation.

The memory clearing unit 400 includes a memory clear unit 440. The memory clear unit 440 may clear a section in memory, for example, by writing zeros. When available, the memory clear unit 440 clears memory by writing into a store buffer that updates a cache that updates the memory. According to an embodiment of the present invention, the memory clear unit 440 clears a first section of memory upon TLA creation. According to a further embodiment of the present invention, the memory clear unit 440 clears a second section of memory upon object allocation when the size of the object is larger than the available cleared space in memory. In this embodiment, the size of the section of memory cleared is decoupled from the TLA size such that the size of the cleared memory is not the same as the TLA size. A memory clear may be configured to have a dimension that is larger than the object size and smaller than the TLA size. It should be appreciated that the physical dimension of a store buffer in a processor may be used to determine the size of the cleared memory.

The memory clearing unit 400 includes a freeline generation unit 450. The freeline generation unit 450 generates a freeline that may be used by the memory clearing unit 400 to mark how much memory has been allocated to objects. The freeline may be used upon object allocation to determine when to perform pre-fetching and when to clear more memory.

Figure 5:
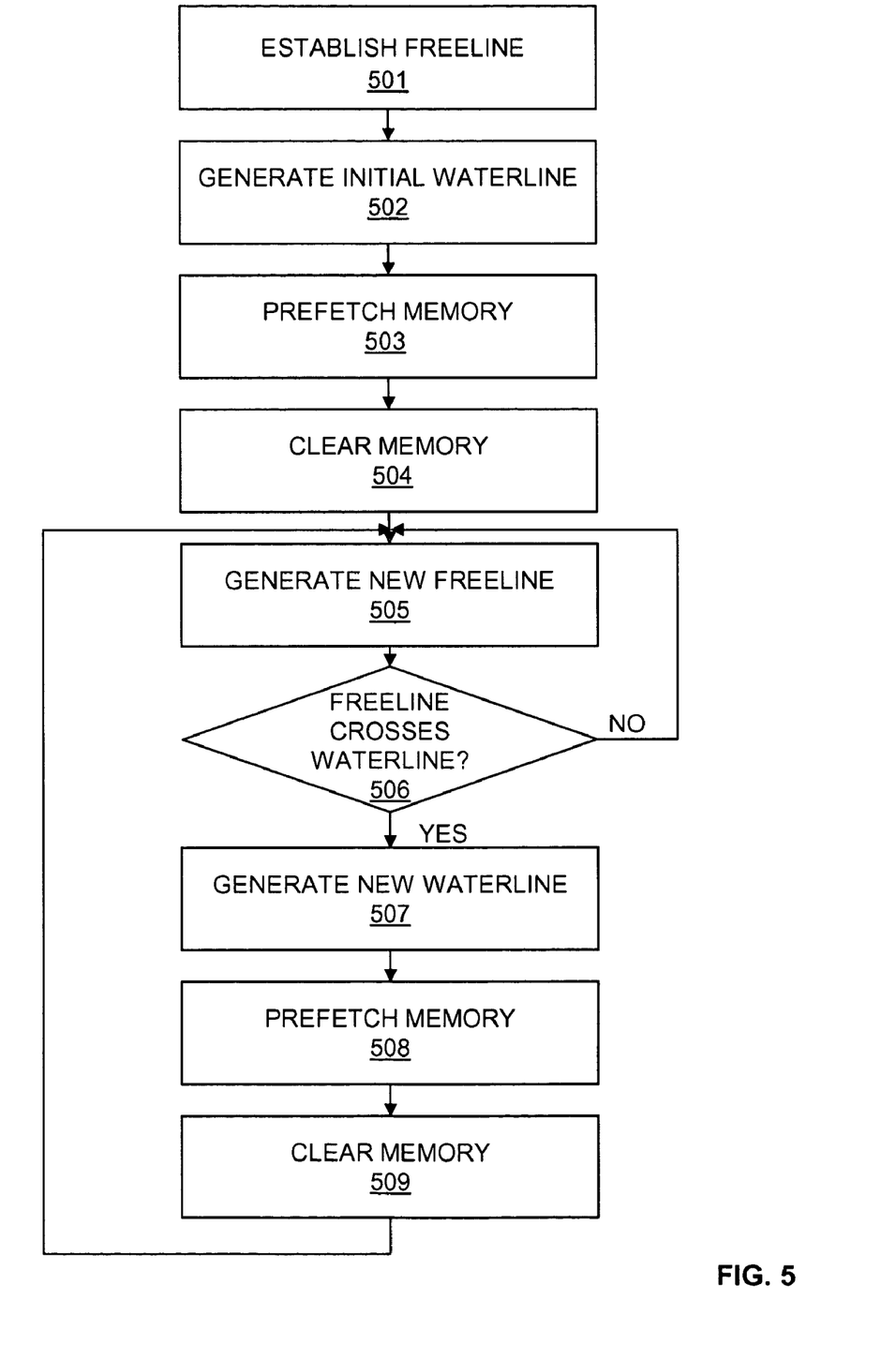
FIG. 5 is a flowchart illustrating a method for clearing memory according to an embodiment of the present invention.

FIG. 5 is a flowchart illustrating a method for clearing memory according to an embodiment of the present invention. At 501, a freeline is generated. According to an embodiment of the present invention, a freeline is generated upon creation of a TLA for a thread. The TLA may be managed such that address locations in the TLA are allocated sequentially and the freeline indicates where in the TLA a next address free address may be allocated.

At 502 a waterline is generated. A waterline may be used to mark an area in the TLA that is to be cleared or that is cleared. The waterline generated at 502 may be referred to as an "initial waterline". According to an embodiment of the present invention, the location of the initial waterline is determined in response to a clear size and a function of the thread.

At 503, locations in memory are pre-fetched. According to an embodiment of the present invention, the locations in memory are pre-fetched in response to the initial waterline generated at 502. According to a further embodiment of the present invention, the locations in memory are also pre-fetched in response to a pre-fetch distance.

At 504, the memory is cleared. According to an embodiment of the present invention, the memory is cleared to the initial waterline generated at 502. The memory may be cleared by writing a store buffer that updates a cache.

At 505, a new freeline is generated. According to an embodiment of the present invention, the new freeline is generated upon allocation of a new object. The location of the new freeline is determined from a location of a previously generated freeline and size of the new object.

At 506, it is determined whether the new freeline crosses the waterline. The new freeline crosses the waterline if the size of the new object is larger than the size of available cleared space in the TLA. If the new freeline does not cross the waterline, control returns to 505. If the new freeline crosses the waterline, control proceeds to 507.

At 507, a new waterline is generated. According to an embodiment of the present invention, the location of the new waterline is determined from a location of the new freeline generated at 505 and clear size.

At 508, locations in memory are pre-fetched. According to an embodiment of the present invention, the locations in memory are pre-fetched in response to the new waterline generated at 507. According to a further embodiment of the present invention, the locations in memory are also pre-fetched in response to a pre-fetch distance.

At 509, the memory is cleared. According to an embodiment of the present invention, the memory is cleared to the new waterline generated at 507. The memory may be cleared by writing a store buffer that updates a cache.

According to an embodiment of the present invention, the following pseudo code may be used to implement procedures 501-504.

```
Set freeline = TLA start;
Upon TLA creation:
    tla-> init_waterline = clear_size +
    gen_init_waterline(thread);
    prefetchnta(tla_start, init_waterline +pref_dist);
    clear_memory(tla_start, init_waterline);
where 0<gen_init_waterline(thread) < clear_size; and the generated
value is a function of the thread.
```

According to a further embodiment of the present invention, the following pseudo code may be used to implement procedures 505-509.

```
Upon object allocation:
    new_freeline = freeline + object size;
    If (object_size + free_line > waterline) {
        new_waterline = new_freeline + clear_size;
        prefetchnta(new_freeline, new_waterline + pref_dist);
        clear_memory(waterline, new_waterline);}
```

The memory clearing unit 400 shown in FIG. 4 and the procedure shown in FIG. 5 provide significant performance advantages over existing techniques for clearing memory during object allocation by reducing the frequency in which a processor is stalled due to the lack of available store buffers by converting write misses into read misses. The penalty associated with the read misses is reduced by pre-fetching a pre-fetch distance in memory that may be used by a subsequent object allocation.

FIG. 5 is a flow chart illustrating a method for clearing memory according to embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Figure 6:
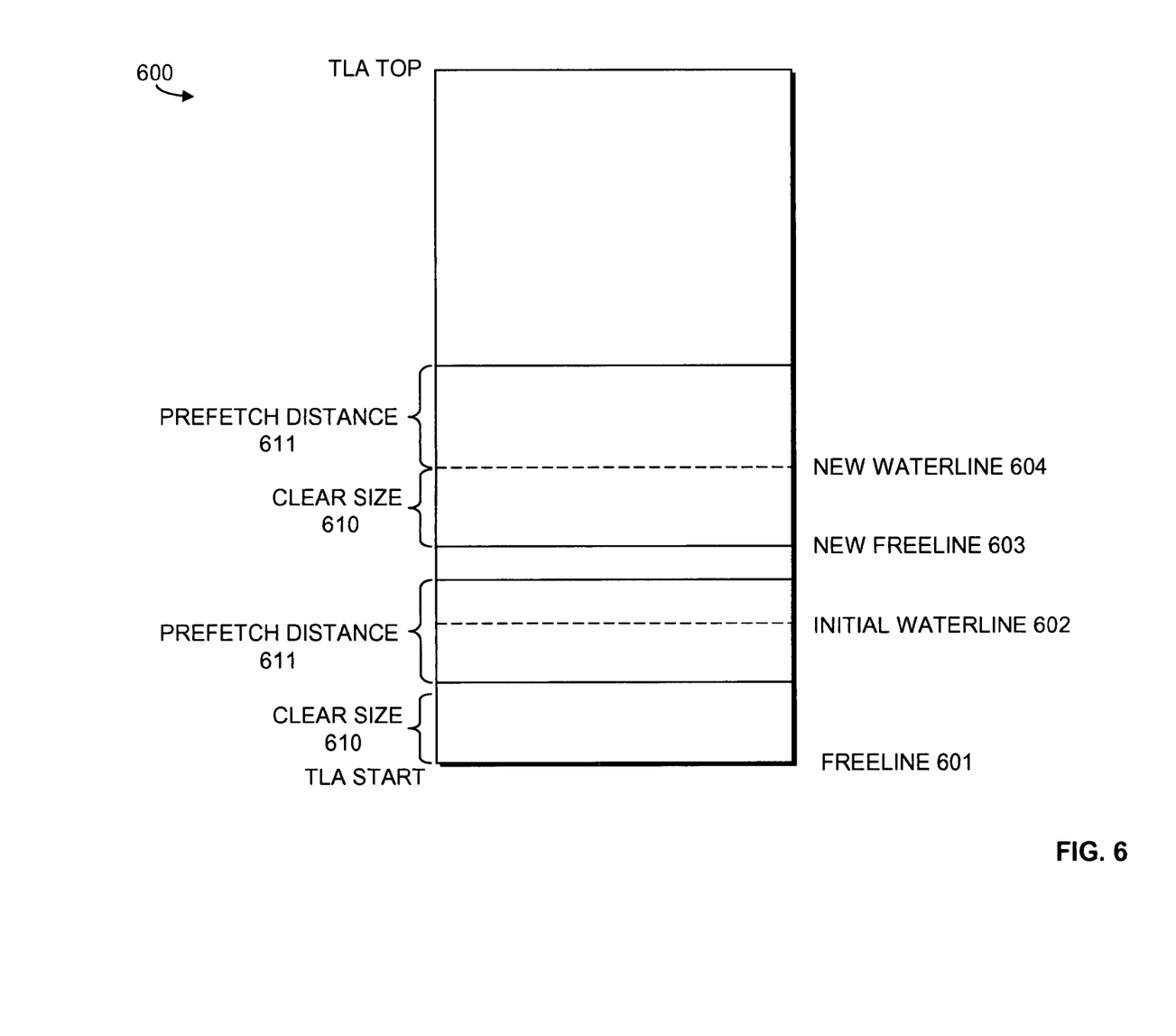
FIG. 6 illustrates a thread local area that is managed according to an embodiment of the present invention.

FIG. 6 illustrates a TLA 600 that is managed according to an embodiment of the present invention. With reference to FIG. 5, upon TLA creation, at 501, a freeline is generated. The freeline indicates how much of the TLA 600 has been allocated for objects. Since no object has been allocated at this point, the freeline is shown as 601 at the TLA start.

At 502, an initial waterline 602 is generated. The waterline may be used to mark an area in the TLA that is to be cleared or that is cleared. The location of the initial waterline is determined in response to a clear size 610 and a function of the thread. The clear size 610 may be a pre-determined, fixed parameter that is tunable to a particular system. As shown, the initial waterline is less than two times the clear size 610.

At 503 locations in memory up to the initial waterline 602 are pre-fetched. According to a further embodiment of the present invention, the locations up to the initial waterline 602 plus a pre-fetch distance 611 are pre-fetched.

At 504, the memory is cleared to the initial waterline 602 generated at 502. The cleared memory up to the initial waterline 602 may be utilized for object allocation. Each time an object is allocated, a new freeline is generated.

At 505, a new freeline 603 is generated upon allocation of a new object. The location of the new freeline is determined from a location of a previously generated freeline and size of the new object.

At 506, it is determined whether the new freeline crosses the waterline. The new freeline crosses the waterline if the size of the new object is larger than the size of available cleared space in the TLA. If the new freeline does not cross the waterline, control returns to 505. If the new freeline crosses the waterline, control proceeds to 507. In this example, the new freeline 603 crosses the initial waterline 602.

At 507, a new waterline is generated 604. According to an embodiment of the present invention, the location of the new waterline 604 is determined from a location of the new freeline 603 generated at 505 and the clear size 610.

At 508, locations in memory up to the new waterline 604 are pre-fetched. According to an embodiment of the present invention, the locations in memory up to the new waterline 604 plus the pre-fetch distance 611 are pre-fetched.

At 509, the memory is cleared to the new waterline 604 generated at 507. The memory may be cleared by writing a store buffer that updates a cache.

It should be appreciated that an appropriate clear size and pre-fetch distance may be selected based upon experimentation. For example, the procedure illustrated in FIG. 5 may be performed where the clear size and/or pre-fetch distance is adjusted until the memory clear procedure yields a desired performance result.

In the foregoing specification embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for performing memory allocation, comprising:
    creating a thread local area for a thread having a section in memory, wherein a size of the section is larger than a size of the object and smaller than a size of a thread local area associated with the thread;
    prefetching the section in response to creating and initializing the thread local area; and
    clearing the section, wherein space in the section is cleared and ready for allocation.

2. The method of claim 1, wherein the size of the object is greater than an amount of space to be cleared in the thread local area.

3. The method of claim 1, wherein the size of the section is a function of the size of the object and a clear size.

4. The method of claim 3, wherein the clear size is a fixed parameter.

5. The method of claim 3, wherein the clear size is tunable.

6. The method of claim 1, further comprising pre-fetching the section in memory into a cache before clearing the section in memory.

7. The method of claim 6, further comprising pre-fetching an additional pre-fetch distance in memory into the cache before clearing the section in memory.

8. The method of claim 7, wherein the pre-fetch distance is tunable.

9. The method of claim 1, wherein clearing comprises writing zeroes.

10. A method for performing memory allocation, comprising:
    creating a thread local area for a thread having a fist section in memory, wherein a size of the first section is smaller than a size of the thread local area;

prefetching the first section in response to creating and initializing the thread local area; and clearing the first section, wherein space in the first section is cleared and ready for allocation.

11. The method of claim 10, wherein the size of the first section is a function of a clear size and the thread.

12. The method of claim 10, further comprising pre-fetching the first section in memory into a cache before clearing the first section in memory.

13. The method of claim 12, further comprising pre-fetching an additional pre-fetch distance in memory into the cache before clearing the first section in memory.

14. The method of claim 10, further comprising clearing a second section in memory in response to an allocation of memory to an object of the thread when the size of the object is greater than an amount of cleared space available in the thread local area.

15. The method of claim 14, wherein the size of the second section is a function of the size of the object and a clear size.

16. The method of claim 10, wherein clearing comprises writing zeroes.

17. A machine readable storage medium including sequences of instructions, the sequences of instructions including instructions which when executed cause the machine to perform:
    creating a thread local area for a thread having a first section in memory, wherein a size of the first section is smaller than a size of the thread local area;
    prefetching the first section in response to creating and initializing the thread local area; and
    clearing the first section, wherein space in the first section is cleared and ready for allocation.

18. The readable storage medium of claim 17, including additional instructions which when executed causes the machine to further perform clearing a second section in memory in response to an allocation of memory to an object of the thread when the size of the object is greater than an amount of cleared space available in the thread local area.

19. The readable storage medium of claim 17, wherein clearing comprises writing zeroes.

20. A memory clearing unit, comprising:
    a memory; a prefetch unit to prefetch a first section in memory in response to creating and initializing a thread local area, wherein a size of the first section is smaller than size of the thread local area; and
    a memory clear unit to clear the first section in memory, wherein space in the first section in memory is cleared and ready for allocation.

21. The memory clearing unit of claim 20, further comprising a waterline generation unit to generate an initial waterline to indicate an amount of cleared space in the memory.

22. The memory clearing unit of claim 21, wherein the initial waterline determines the size of the first section in the memory.

23. The memory clearing unit of claim 20, further comprising a pre-fetch unit to pre-fetch the first section in memory into a cache before clearing the first section in memory.

24. The memory clearing unit of claim 20, further comprising a freeline generation unit to generate a freeline to indicate an amount of memory being utilized in response to object allocation.

25. The memory clearing unit of claim 20, wherein the memory clear unit clears a second section in memory in response to an allocation of memory to an object of a thread when the size of the object is greater than an amount of cleared space available in the thread local area.

26. The memory clearing unit of claim 20, wherein clearing comprises writing zeroes.

27. A computer system, comprising:
    a memory; and
    a processor implementing a prefetch unit to prefetch a first section in response to creating and initializing a thread local area, wherein a size of the first section is smaller than a size of the thread local area, and a memory clear unit to clear the first section in memory, wherein space in the first section in memory is cleared and ready for allocation.

28. The computer system or claim 27, wherein the memory clear unit clears a second section in memory in response to an allocation of memory to an object of a thread when the size of the object is greater than an amount of cleared space available in the thread local area.

29. The computer system of claim 27, wherein to clear comprises to write zeroes.

* * * * *